United States Patent [19]

Cooke, Jr. et al.

[11] Patent Number: 4,862,617
[45] Date of Patent: Sep. 5, 1989

[54] DETACHABLE MESSAGE-CARRYING DEVICE

[76] Inventors: Edward J. Cooke, Jr., 451 Middlesex Rd.; Frank S. Cooper, Jr., 26 Deepwood Rd., both of Darien, Conn. 06820

[21] Appl. No.: 563,753

[22] Filed: Dec. 21, 1983

[51] Int. Cl.$^4$ ............................................. G09F 3/08
[52] U.S. Cl. ...................................... 40/663; 40/299; 40/331
[58] Field of Search ............. 40/2 A, 20 R, 331, 19.5, 40/10.0, 299, 663

[56] References Cited

U.S. PATENT DOCUMENTS

| | | | |
|---|---|---|---|
| 653,267 | 7/1900 | Short | 40/2 A |
| 1,338,181 | 4/1920 | Kalkbrenner | 40/2 A |
| 1,430,641 | 10/1922 | Ginn | 40/20 R |
| 1,749,399 | 3/1930 | Thayer | 40/2 A |
| 2,761,231 | 9/1956 | Hess | 40/19.5 |
| 3,422,558 | 1/1969 | Fee | 40/20 R |
| 3,775,882 | 12/1973 | Wheeler | 40/10 C |

FOREIGN PATENT DOCUMENTS

| | | | |
|---|---|---|---|
| 163103 | 1/1949 | Austria | 40/19.5 |
| 38975 | 1/1907 | Switzerland | 40/2 A |
| 270753 | 6/1927 | United Kingdom | 40/20 R |
| 528705 | 11/1940 | United Kingdom | 40/19.5 |
| 879623 | 10/1961 | United Kingdom | 40/20 R |

Primary Examiner—Gene Mancene
Assistant Examiner—Wenceslao J. Contreras
Attorney, Agent, or Firm—St.Onge Steward Johnston & Reens

[57] ABSTRACT

A message-carrying device (e.g., a key ring holder) wherein the device is provided with a restricted passageway communicating between a central opening and an opening along the edge of the device for receiving a portion of an article to which the device is to be affixed, and wherein the central opening, but not the restricted passageway, can accommodate a different portion of the article.

18 Claims, 1 Drawing Sheet

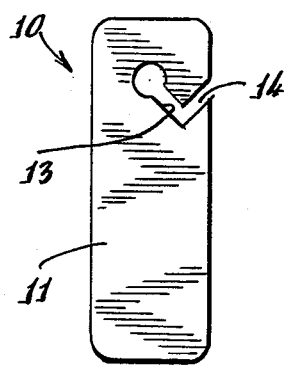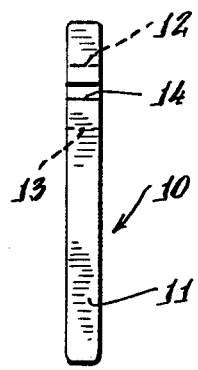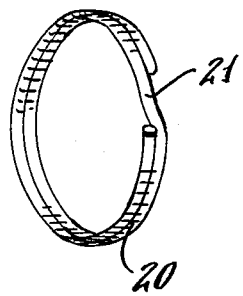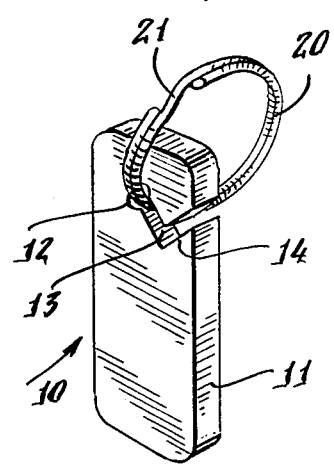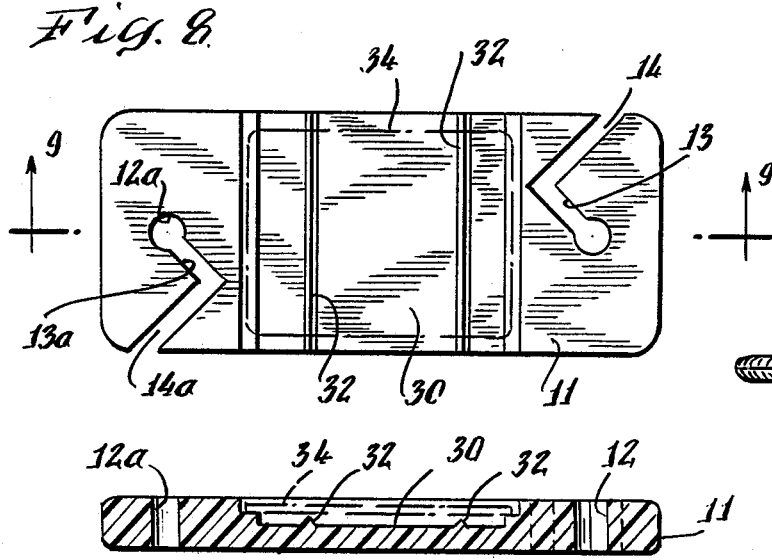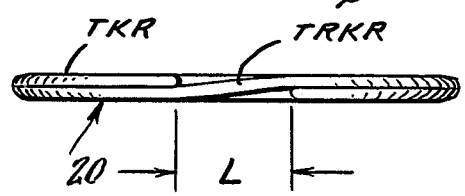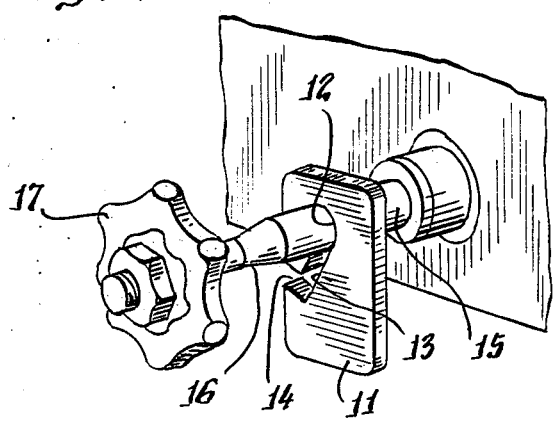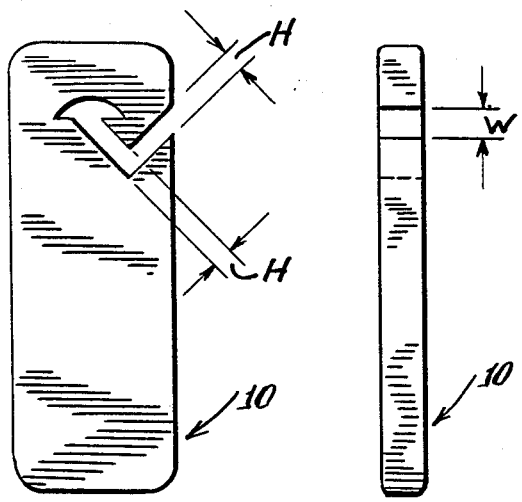

DETACHABLE MESSAGE-CARRYING DEVICE

BACKGROUND OF THE INVENTION

The present invention relates to a message-carrying device and, more particularly, to a message-carrying device which can be securably affixed to a ring, stem or other like article, but which is removable therefrom by means of simple manipulation.

Instances abound where it is desirable to provide a tag or other device which bears information for affixing to a particular article or structure either to serve as a means for identification, reminder or the like. For example, in both industrial and home environments, it often is desirable to provide a tag on valves, switches, equipment and the like to serve as a means for identifying particular fluid and/or electrical lines or to carry information regarding either instructions for operation, warnings, reminders as to periodic servicing, etc.

Other examples where such message-carrying tags would be desirable include tags bearing identifying information or information regarding vaccinations, etc. which would be affixed to a pet collar.

In all these cases, it is of course desirable that the message-carrying tag be capable of being securably affixed to the article in question. At the same time, however, it would be desirable if the message-carrying device also is capable of being removed or detached from the article through some simple means. In this way, the various reminders, identification, instructions or other information can be replaced, updated, revised, etc. without need for partially or completely disassembling the article or other difficult and time consuming measures.

Another example where a detachable message-carrying device would have extensive utility is in the field of key ring holders. Given the regularity with which most persons utilize their keys, be it for driving a car or opening mailboxes or doors, a key holder would provide an ideal means for carrying a reminder message of many types, e.g., with respect to the need for automobile maintenance, keeping of periodic appointments, and the like. In order to have utility for such purpose, the message-carrying means (e.g., key holder) must of necessity be inexpensive (such that it can, for example, be given by a proprietor to a customer free of charge as an incident to a service or sale) and must be easily attachable and detachable to or from keys or a key ring such that periodic replacement can be easily effected. For example, incident to the sale of a new automobile, the seller could provide a customer with a key holder carrying a message with respect to the mileage at which a particular maintenance is scheduled (e.g., an oil change). When the automobile is serviced according to the reminder, a new key holder can be given with a new reminder message with respect to the next scheduled service. To be effective for this type of merchandising plan, the key holder must, of course, be inexpensive and capable of easy attachment to and detachment from a key or key ring.

Wholly apart from the foregoing message-carrying function, there also exist many instances where it is necessary or desirable to remove only a particular key or keys from a key ring or key case containing a multitude of keys. For example, numerous situations arise where it is necessary to leave an automobile ignition key with a parking lot attendant or service station or where house keys must be left with someone for deliveries, and where it is not desired or advisable to hand over an entire set of keys. For most key rings and cases, removal of only one or two keys generally is a cumbersome task because the rings or cases are designed primarily to securably hold a set of keys and this typically is at the expense of easy key removal. Thus, removal of particular keys from a key ring generally requires opening of the key ring. In some cases, removal of a particular key requires removal of a number of keys until the desired one is reached, followed by reattachment of the removed keys to the ring. The same is true for key cases having a series of small detachable rings provided with coupling balls which are received and retained in sockets in the key case. Removal of a key-containing ring from the case is difficult in most circumstances, particularly where one is in a hurry. Key holders having a female recess for engaging a male plunger-like element, having a key or key ring attached thereto, in a spring loading and release mechanism, offer some solution to the foregoing problems, but are expensive to manufacture and are subject to spring damage with repeated use.

Prior art in the field of detachable keys and/or key rings include Billings, Jr., U.S. Pat. No. 3,315,504; Drake, U.S. Pat. No. 4,306,434; Klaber, U.S. Pat. No. 4,317,638; Rossi, U.S. Pat. No. 3,481,169; and Stoffel, U.S. Pat. No. 4,358,944. However, in none of these patents is there described an inexpensive combination key ring and holder wherein the ring is securably held by the holder while at the same time being removable therefrom by means of easy manipulative steps. Moreover, in none of these patents is there described the use of such a holder for carrying information requiring periodic updating, revision, etc.

SUMMARY OF THE INVENTION

It is an object of the present invention to provide a message-carrying device which can be securably affixed to an article but easily removable or detachable therefrom by means of a simple manipulative process.

Another object of the present invention is to provide a key ring holder and a key ring/key ring holder combination, in which the key ring can be securably held within the holder but is removable therefrom by means of an easy manipulative process.

Yet another object of the present invention is to provide a key ring holder of the type noted above which can be adapted to carry a message, reminder or other form of information.

These and other objects of the invention are achieved by the provision of a message-carrying device comprised of a unitary, planar, substantially rigid body portion in which at least one substantially centrally disposed opening extending in a normal (perpendicular) direction through the plane of the body portion is provided. The central opening is sized so as to accommodate at least some portions of the article to which it is affixed (e.g., some portions along a ring perimeter, portions along a valve stem, etc.). The body portion is provided with a slot, also extending perpendicularly through the plane of the body portion, communicating between the central opening and a receiving opening provided along the edge of the body portion. The slot and receiving opening define a restricted passageway whose dimensions are such as to be capable of accommodating only a particular portion or region of the article to which it is affixed (e.g., an area of reduced thickness on a ring or an area of reduced thickness on a valve stem). The passageway is arranged such that the path from the receiving opening to the central opening includes at least one angle of less than 180°.

In accordance with the present invention, attachment and removal of the message-carrying device to or from some article requires that the area on the article which can be accommodated by the dimensions of the restricted passageway be brought into registry with the slot and receiving opening. The device is then wended by hand manipulation either to or away from the central opening as the case may be.

Arrangement of a message or other information on the message-carrying device can be accomplished in a number of ways. For example, the device can be constructed so as to have an area for receiving a card or other printed material or a material on which a message can be written. In addition or alternatively, the device can have a message or information affixed directly thereon, e.g., by embossed printing or other like means.

A particular advantage of the present invention is that the message-carrying device is of simple construction and can be made from inexpensive materials. Coupled with the feature of easy attachment and detachment from an article, this makes the message-carrying device ideally suited for gift or promotional purposes in association with advertising or promotional purposes whereby the device can be periodically replaced in toto. Thus, for example, devices of this type can be provided to customers with a suitable message and/or advertising, for example, by service stations, after each servicing of the customer's automobile, wherein the device can be attached to a key ring and wherein the message carries information regarding when the next servicing is required, or by physicians or veterinarians regarding next scheduled appointments, or the like, wherein the device can be attached to a key ring, a ring on a pet collar, etc.

BRIEF DESCRIPTION OF THE DRAWINGS

FIG. 1 is a planar view of a key ring holder;

FIG. 2 is a view taken along the edge of the key ring holder shown in FIG. 1 (i.e., rotating the holder of FIG. 1 through 90° toward the plane of the paper);

FIG. 3 is a perspective view of a key ring having an area of reduced thickness along its perimeter;

FIG. 4 is a perspective view of an assembled key ring and key ring holder;

FIGS. 5, 6 and 7 are as in FIGS. 1, 2 and 3 to show the dimensioning of the various elements;

FIG. 8 is a planar view of a preferred key ring holder according to the invention;

FIG. 9 is a sectional view along the plane 9—9 of FIG. 8; and

FIG. 10 is a perspective view of a message-carrying device in association with a valve stem.

DETAILED DESCRIPTION OF THE INVENTION

In accordance with the present invention, a message-carrying device is provided which can be attached to and detached from an article by means of simple manipulation, but which, when attached, is securably held by the article such that the message device cannot inadvertently be disengaged from the article.

For purposes of describing particular features of the present invention, an embodiment wherein the message-carrying device is a key ring holder is first described in detail. As will be understood by reading such description, aspects of the invention having particular applicability to combinations of key rings and key ring holders may or may not also be required or applicable when the message-carrying device is not a key ring holder but is adapted for some other use (e.g., a tag for valve stems, switches, etc.).

In accordance with the invention, a key ring holder 10 is provided having a body member or portion 11 and at least one substantially centrally disposed opening 12 which extends perpendicularly through the plane of body portion 11. A slot 13 is provided in the body portion 11 which also extends perpendicularly through the plane of body portion 11 and which communicates with central opening 12 and terminates in a receiving opening 14 at the edge of body portion 11. The restricted passageway defined by slot 13 is such as to contain at least one angle of less than 180° along the passage.

The body portion 11 of the key holder is most easily provided as a solid unitary blank in which central opening 12 and slot 13 (including receiving opening 14) are cut, molded or punched out. The body portion is made of rigid or semi-rigid material (e.g., polystyrene or other high polymer or copolymer plastic) such that the passageway to the central opening cannot be altered by deforming or twisting the body portion. The overall dimensions of the body portion 11 are not critical per se, but the thickness of the body portion (see edge view of FIG. 2) should be such as to (a) confer sufficient rigidity to the key holder, (b) preferably be of sufficient thickness such that means (as described in further detail hereinafter) for the insertion and carrying of a message or card can be provided, and (c) most importantly, to define the requisite width dimensions for the receiving opening 14 and slot 13 for receiving (or disengaging) a key ring on or from the holder. Thus, the thickness of body portion 11 defines the width of slot 13 and opening 14. This width is such as to be no greater than the length of the area of reduced thickness provided on the key ring. A larger thickness would not permit the ring to be received by or disengaged from the holder, since the height dimension of the slot and receiving opening are such as to define a passageway through which areas of the ring other than those of reduced thickness cannot pass. Hence, if the width of slot 13 and opening 14 are larger than the length of the reduced thickness area on the ring, the thicker areas of the ring would prevent the ring from passing along the passsageway.

Center opening 12 is positioned substantially centrally within the width dimension of the body portion 11. The sizing of center opening 12 is such that it can accommodate at least some portions along the key ring perimeter which are not of reduced thickness (and, preferably, the thickest portion of a key ring) in a manner such that at least some significant portion of the ring can be substantially freely rotated through the center opening. While the center opening 12 in the figures is shown to be circular, this is not an essential requirement for purposes of the present invention, and the opening can generally be of any shape.

When referring to the "shape" of the center opening 12, the actual dimensions referred to are those the central opening would have if not interrupted by its communication with slot 13.

The positioning of the opening 12, relative to the length of body portion 11 and the location of receiving opening 14, is such that a key ring inserted into (or removed from) receiving end 14 can be manipulated through the passageway defined by slot 13 in such a way as to not engage and be restrained by the body portion 11. These relative dimensions also, of course, are dependent upon the overall size of the key ring. When the key ring is disposed within central opening 12, the ring should be capable of extending above body portion 11 a sufficient distance in order that the body portion not interfere with keys held by the key ring.

Key ring 20 (FIG. 3) is shown as an integral circular key ring, but may be of any shape (e.g., oval, triangular, rectangular) so long as at least one (preferably only one) area 21 along its perimeter is of reduced thickness. The reduced thickness area 21 is such as to pass through (preferably with only minimal tolerance) receiving opening 14 and slot 13, while all other areas of the key ring are sized to be normally incapable (absent use of excessive force) of being passed through the receiving opening and slot.

In operation, therefore, a key ring 20 is rotated such that its area of reduced thickness 21 is in registry with receiving opening 14 on the key holder. The reduced area 21 is then manipulated through the angled passageway of slot 13 until it reaches central opening 12, at which point the entire ring 20 can be freely moved and rotated in the opening 12.

While engaged with the key holder at central opening 12, the key ring requires manipulative working in order to be removed from the holder because of the angled passageway and the fact that only the area of reduced thickness of the key ring can be passed through slot 13 and receiving opening 14. Thus, the key ring is securably held in central opening 12 and unintended slippage off the key ring holder is virtually impossible. For removal, the reduced thickness area of the ring is brought into registry with slot 13 and passed through the angled passageway for removal at opening 14.

The passageway defined by slot 13 contains at least one angle of less than 180°, and preferably will contain at least one angle of 90° or less. The passageway may contain any number of such angles, the purpose being to eliminate the possibility of inadvertent disengagement of the key ring from the key ring holder even if the area of reduced thickness on the key ring might come into registry with slot 13.

The relationship among the various length dimensions of the key ring, key ring holder, openings, etc. in the preferred embodiment of the invention can be expressed by the following series of mathematical expressions:

$$A_{CO} \geq T_{KR}$$

$$T_{KR} > H$$

$$T_{RKR} \leq W$$

$$T_{RKR} \leq H$$

$$W \leq L$$

wherein (see FIG. 5, FIG. 6 and FIG. 7):
 $A_{CO}$ is the maximum open area of the central opening (e.g., for a circular, semi-circular, triangular, etc. central opening);
 $T_{KR}$ is the thickness of the thickest portion of the key ring;
 W is the width of the receiving opening;
 H is the height of the passageway (receiving opening and slot);
 $T_{RKR}$ is the thickness of the area of reduced thickness on the key ring; and
 L is the length of the area of reduced thickness along the perimeter of the key ring.

In a preferred embodiment of the invention illustrated in FIG. 8 and FIG. 9, the key holder comprises body portion 11 in which are disposed two center openings 12 and 12a, each opening connected to a receiving opening 14 and 14a by way of slot 13 and 13a, the passageway defined by the slot being restricted so as to accommodate only a portion of a key ring having an area of reduced thickness. This embodiment is particularly useful for accommodating two key rings, one of which contains, e.g., only an automobile ignition key and one of which contains all other keys. Alternatively, one of the central openings can be a completely enclosed opening for retaining a key ring having those keys as to which removal according to the present invention is not considered necessary. When it is required to leave the ignition key with the automobile (e.g, at parking garages or service stations), the ring containing the ignition key is simply disengaged from the holder by bringing the ring into registry with the restricted passageway and manipulating the holder such that the ring passes through the passageway and out the receiving opening.

In the preferred embodiment of a key ring holder according to the invention, the body portion 11 of the key ring holder is provided with a recessed area (see FIG. 9) into which a suitably printed message or card can be inserted and retained. Thus, body portion 11 is constructed so as to have a recessed area 30 defined by suitably stepped indentations on the body portion and a viewing member 34, preferably of transparent, thin, yet semi-rigid plastic, affixed (e.g., glued, ultrasonically welded) to the indentations at its snapped in, edges. The recessed area of the body portion is provided with one or more upwardly extending projections or dimples 32 at the edge of the body portion such that when a card is inserted into the recessed area through the edge of the body portion, it can slide over projections 32 but is then held within the recess by the projections to prevent the card from being taken out of the recess. The body portion 11 can be constructed such that the recess is open and accessible only at one edge of the body portion or at both edges, in which case projections 32 are provided on the body portion at each such edge. While it is possible to construct the key ring holder such that an integral (e.g., transparent plastic) material is employed for the entire body portion in which a suitable recess is provided (e.g., by molding the body with an insert, and then removing the insert), it will generally be found that the machining required to effect such molding is expensive. Preferably, therefore, the construction of the key ring holder is in two steps, wherein a suitably dimensioned body portion having a pre-cut recess is provided, after which a permanent covering (element 34) for the recess is affixed to define a slotted opening in the body portion. Of course, other construction methods may be employed.

The recess in the body portion 11 can also be arranged such that a complete overlay element is not utilized, i.e., wherein only a border element is used to define the slotted recess for holding a card. In this embodiment, the area within the border is open to permit writing on the card, viewing, etc.

In still other embodiments, the body portion can be constructed so as to have a recessed area into which can be placed (e.g., adhesively or by die-stamping) either a preprinted message or a material on which a message can be handwritten or printed, in which case a slotted opening is not required. In addition, the body portion can be itself constructed of transparent material whereby a message or advertisement on a card inserted into the holder (either through a slot or into a recess) can be read through the holder.

As earlier noted, the present invention is not limited to key ring holders per se and many other message-carrying devices are possible. One embodiment of such a device is illustrated in FIG. 11 wherein there is shown a valve stem on which a message-carrying device according to the present invention is affixed. The valve stem (having typical clover-leaf turning element 17) is constructed such that at least two different diameters are presented along the cylindrical stem. Thus, along length 16 of the stem, the diameter (or cross-sectional area) is smaller than that along length 15. The message-carrying device is constructed such that center opening 12 can accommodate the area along length 15, but slot 13 and receiving opening 14 cannot accommodate this same area. Accordingly, to attach or disengage the device to or from the valve stem, the slot 13 and receiving opening 14 must be brought into registry with length 16. Secured fixing of the device to the stem is achieved simply by moving the device along the stem (through center opening 12), to a point where length 15 is reached. In an alternative embodiment, the differing cross-sectional areas along the stem can be provided by constructing a tapered stem having gradually increasing or decreasing cross-sectional area along its length.

While features of the present invention have been described with reference to specific materials, shapes and arrangements, these are intended to be merely illustrative of the many forms which can be provided within the spirit and intent of the invention, the scope of which is defined in the appended claims.

What is claimed is:

1. A message-carrying device adapted to be securably affixed to an article but at the same time capable of easy attachment to or detachment from the article, said device comprising:
    a planar body portion of rigid material;
    at least one substantially centrally disposed opening extending perpendicularly through the plane of said body portion for receiving a first portion of an article to which said device is to be affixed;
    and a slot extending perpendicularly through the plane of said body portion, said slot communicating with said central opening and terminating in a receiving opening at the edge of said body portion, said slot defining a restricted passageway extending from said central opening to said receiving opening, the path through said restricted passageway containing at least one angle of less than 180°, wherein the dimension of said slot and receiving opening are such that they can accommodate a second portion of the article to which the device is to be affixed but cannot accommodate said first portion of said article and wherein the rigidity of the material of said planar body portion is such that said passageway to the central opening cannot be altered by deforming or twisting of the body portion;
    whereby said message-carrying device can be attached to and detached from said article when the second portion of said article is brought into registry with said restricted passageway.

2. The message-carrying device according to claim 1 wherein said article is of cylindrical shape, and wherein said first and second portions of said article consist of lengths along the article having differing cross-sectional areas.

3. The message-carrying device according to claim 1 wherein a message is affixed directly on the body portion of said device.

4. The message-carrying device according to claim 1 wherein said body portion is constructed so as to include a recess and a cover member defining a slotted opening adapted to receive a suitably dimensioned planar message-bearing article.

5. The combination of a key ring and key ring holder comprising:
    an integral continuous key ring adapted to receive and securably hold one or more keys, said key ring having along its perimeter at least one area of reduced section; and
    a holder member for said key ring, said holder member comprising:
    a planar body portion of rigid material; at least one substantially centrally disposed opening extending perpendicularly through the plane of said body portion for receiving and holding said key ring, said central opening being dimensioned so as to accommodate therein the thickest section of said key ring; and a slot extending perpendicularly through the plane of said body portion, said slot communicating with said central opening and terminating in a receiving opening at the end of said body portion, said slot defining a restricted passageway for said key ring extending from said receiving opening to said central opening, the path through said restricted passageway containing at least one angle of less than 180°, wherein the size of said slot is equal to or greater than the area of reduced section on said key ring and smaller than all sections along said key ring other than said reduced section and wherein the rigidity of the material of said planar body portion is such that said passageway to the central opening cannot be altered by deforming or twisting of the body portion;
    whereby said key ring can be attached to and detached from said holder at said central opening when the reduced section of the key ring is brought into registry with said restricted passageway.

6. The combination key ring and key ring holder according to claim 5 wherein said key ring is a circular key ring.

7. The combination key ring and key ring holder according to claim 5 wherein said key ring is a rectangular key ring.

8. The combination key ring and key ring holder according to claim 5 wherein said key ring is a triangular key ring.

9. The combination key ring and key ring holder according to claim 5 wherein said restricted passageway contains at least one angle of 90° or less.

10. A combination key ring holder and key ring comprising:
    an integral continuous key ring having along its perimeter a length having a reduced thickness relative to the thickness of the remaining length of the key ring; and a holder member for the key ring, comprising a planar body portion of rigid material in which at least one substantially centrally disposed opening, extending perpendicularly through the plane of said body portion, is provided, and a slot, extending perpendicularly through the plane of said body portion, said slot communicating with said central opening and a receiving opening on the edge of said body portion, said slot defining a restricted passageway containing at least one angle of less than 180°, wherein the rigidity of the material of said planar body portion is such that said passageway to the central opening cannot be altered by deforming or twisting of the body portion, and wherein the dimensions of the various elements meet the following mathematical expressions:

$$A_{CO} \geq T_{KR};$$

$$T_{KR} > H;$$

$$T_{RKR} \leq W;$$

$$T_{RKR} \leq H; \text{ and}$$

$$W \leq L$$

wherein
$A_{CO}$ is the maximum open area of said central opening;
$T_{KR}$ is the thickness of the thickest portion of the key ring;
$T_{RKR}$ is the thickness of the length of reduced thickness of the key ring;
W is the width of the receiving opening;
H is the height of the passageway defined by the receiving opening and said slot; and
L is the length of the area of reduced thickness of the key ring.

11. The combination according to claim 10 wherein the shape of said central opening is circular.

12. The combination according to claim 10 wherein the shape of said central opening is semi-circular.

13. The combination according to claim 10 wherein the shape of the central opening is triangular.

14. The combination according to claim 10 wherein the shape of the central opening is rectangular.

15. The combination according to claim 10 wherein said restricted passageway contains at least one angle of 90° or less.

16. A key ring holder comprising:
a planar body portion constructed of substantially rigid material;
at least one substantially centrally disposed opening extending perpendicularly through the plane of said body portion, said central opening adapted to accommodate a key ring;
a slot extending perpendicularly through the plane of said body portion, said slot communicating with said central opening and a receiving opening on the edge of said body portion, said slot defining a restricted passageway having at least one angle of less than 180°, the height of said passageway and receiving opening being such as to accommodate an area of reduced thickness along the perimeter of a key ring, and wherein the rigidity of the material of said planar body portion is such that said passageway to the central opening cannot be altered by deforming or twisting of the body portion.

17. The key ring holder of claim 16 wherein said body portion is provided with a recess and cover member therefor, whereby said cover member and recess define a slotted opening in said body portion adapted to receive a suitably dimensioned planar article.

18. The key ring holder of claim 16 wherein said body portion is provided with a recessed area into which a card or message can be directly inserted.

* * * * *